Sept. 5, 1961          H. G. MEAD          2,999,121

FAST ACTING TOTALLY EXPENDABLE IMMERSION THERMOCOUPLE

Filed May 14, 1958          2 Sheets-Sheet 1

Sept. 5, 1961  H. G. MEAD  2,999,121
FAST ACTING TOTALLY EXPENDABLE IMMERSION THERMOCOUPLE
Filed May 14, 1958  2 Sheets-Sheet 2

United States Patent Office 2,999,121
Patented Sept. 5, 1961

2,999,121
FAST ACTING TOTALLY EXPENDABLE IMMERSION THERMOCOUPLE
Harold G. Mead, Rosemont, Pa., assignor to Leeds and Northrup Company, Philadelphia, Pa., a corporation of Pennsylvania
Filed May 14, 1958, Ser. No. 736,947
32 Claims. (Cl. 136—4)

This invention relates to thermocouple devices and more particularly to a simple, inexpensive thermocouple unit and has for an object the provision of a prefabricated and calibrated thermocouple unit which may be used but once in making a temperature measurement and then replaced by a similar unit for subsequent measurement to obtain each time an accurate measurement of temperature. The present application is a continuation-in-part of my application Serial No. 461,809, filed October 12, 1954, now abandoned, The present invention is specially adapted for use in the measurement of molten materials, particularly steel, where the temperature thereof is detected by immersing the measuring or hot junction of a thermocouple device in the bath of molten material and allowing it to remain until the thermocouple reaches the temperature of the bath. In such use, due to the high temperatures and the nature of the molten material, thermocouples are subject to change of calibration through contamination and, unless frequently checked for accuracy, may give results that are seriously inaccurate.

In the steel making art, for example, the temperature of molten metal in an open hearth approaches 3000° F. In accordance with prior practice, thermocouple elements respectively of pure platinum and of an alloy of platinum with rhodium are commonly used to form the thermocouple. The measuring junction is protected by a fused silica tube which is renewed after each measurement to avoid the possibility of porosity or breakage through frequent immersion. A supply of the thermocouple materials is usually stored within the device and arranged so that additional lengths can be withdrawn and a new junction welded after cutting off the portion thought to be contaminated.

The prior practice leaves must to be desired in several respects. To be certain of accuracy, the calibration should be checked after each reading. This is inconvenient and is seldom, if ever, done. Moreover, replacement of the protecting sheath, and renewal of the hot junction of the thermocouple by cutting off lengths of the end portions of the elements and rewelding them, are not operations readily carried out by furnace-operating personnel. When a sheath is removed under plant conditions there is always a chance that contaminating material will be deposited on the thermocouple and result in change in calibration upon heating. Still another difficulty with present immersion thermocouple devices is that there is no mechanical protection for the protecting sheath and both the sheath and thermocouple are frequenly damaged during handling of the device.

The present invention eliminates the above problems by providing an expendable, low cost, prefabricated thermocouple unit which may be easily and rapidly connected for use. After immersion in the bath of molten material and the taking of a temperature measurement, the unit may be discarded and replaced by another similar pre-calibrated thermocouple unit. In carrying out the concept of an expendable thermocouple, the thermocouple elements for the hot junction, which for measurement of molten steel may comprise platinum, and an alloy of platinum and rhodium, are made of extremely short length and very small cross section. Reduction to a minimum of the expensive material makes an expendable unit practicable and at the same time results in more rapid response in the assumption by it of the temperature of the molten material. The thermocouple elements are joined to suitable compensating lead-wire structure of base metal at a point close to the hot junction of the thermocouple. The base metal compensating leads extend to a reference junction, usually located at the measuring instrument.

More particularly, and further in accordance with the invention, the expendable thermocouple unit which is to be used in obtaining measurement of the temperature of molten material comprises a supporting structure for the thermocouple elements. The supporting structure is of electrically non-conductive material having a low heat transfer characteristic. Corresponding ends of the thermocouple elements of short length and small cross section are joined together in spaced relation from a face of the supporting structure to form the measuring junction. The opposite or free ends of the thermocouple elements are connected within the supporting structure to compensating lead-wire structures of low cost material, the connections being in that part of the structure to be submerged in the molten material when the unit is immersed for temperature measurement. The thermocouple elements extending from one end or the face of the supporting structure are encased within a rigid sheath member which electrically insulates, supports and protects the elements. The lead-wire structure extends from the opposite end or another face of the supporting structure for ready connection to a temperature measurement system.

In order to preserve the compensating characteristics of the lead-wire structures during the course of measurement, the portions of the lead-wire structure adjacent the junctions are made of a size much greater than the cross-section of the thermocouple elements in order to conduct heat from the points of electrical connection with the compensating leads. This feature greatly aids in maintaining the accuracy of the thermocouple during temperature measurement.

A thin metal cap or cover which quickly melts away during immersion is applied to protect the hot-junction and the sheath in which it is enclosed against mechanical injury due to handling, and against floating slag on the molten metal.

For other objects and advantages of the present invention reference may be had to the following description taken in conjunction with the accompanying drawings, in which.

Figure 1:
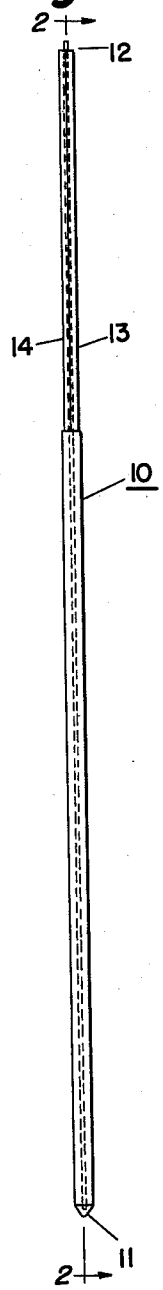
FIG. 1 is a side elevation of an instrument embodying the present invention.
Figure 2:
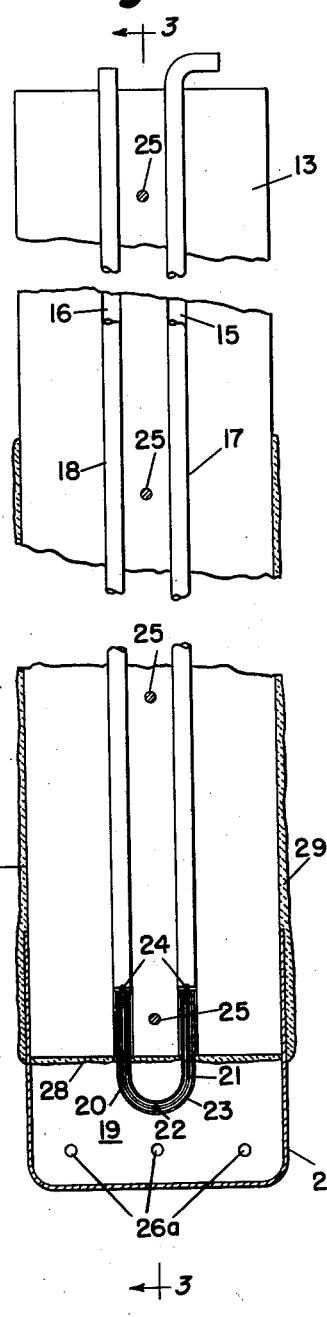
FIG. 2 is an enlarged sectional elevation taken on the line 2—2 of FIG. 1 illustrating constructional details of the present invention.
Figure 3:
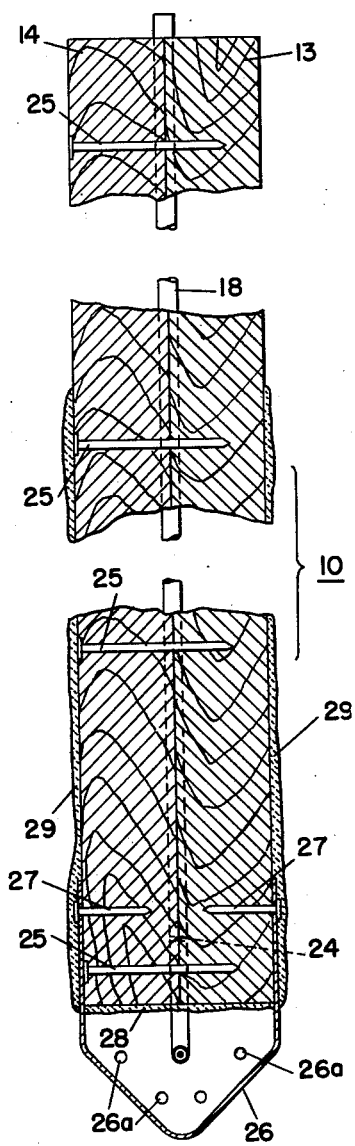
FIG. 3 is a cross section taken along a line substantially corresponding to line 3—3 of FIG. 2 illustrating other constructional features of the present invention.

Referring now to FIGS. 1-3, the invention has been shown in one form as applied to an assembly 10 approximately eight feet in length and which is intended to be totally expendable. The assembly 10 is of the spear type, the lower end 11 of which carries a thermocouple adapted to be immersed in a bath of molten metal whose temperature is to be measured. Lead wires or lead-wire structures extend from the thermocouple elements in the region of the lower end 11 to the upper end 12 of the assembly 10 and thence to conventional measuring apparatus generally including an exhibiting instrument for direct reading and recordation of the temperature of the molten metal.

Not only to minimize cost but also because satisfactory, the assembly 10 includes a body formed by two strips of wood 13 and 14 suitably secured together as by screws or by nails 25, as shown in FIG. 3. The strips 13 and 14 each have a pair of grooves 15 and 16 laterally spaced one from the other and extending the full length of the strips. When the two strips 13 and 14 are assembled in face-to-face relation, the grooves 15 and 16 are of adequate size to receive and to support the lead-wire structures 17 and 18 and the thermocouple assembly 19 now to be described.

The thermocouple assembly 19 includes thermocouple elements 20 and 21, both very short and both of fine gauge wire. One wire may be of platinum and the other an alloy of platinum including 10% of rhodium. The thermocouple element 20 extends outwardly from the groove 16, while the element 21 extends outwardly from the groove 15. The outwardly extending portions of the elements 20 and 21 are electrically connected together. They are preferably welded together to form the hot or measuring junction 22. The elements 20 and 21, including the measuring junction 22, are enclosed by and in contact with the inner walls of a close fitting thin-walled capillary sheath 23 formed of heat-refractory material, such as silica or quartz. The sheath itself extends inwardly of the grooves 15 and 16. Preferably, the ends of the sheath lying in the groove are cemented in place to provide a rigid and strong assembly of the sheath which itself forms a support for the thermocouple elements 20 and 21. The cement will preferably be of heat-refractory character, and it is generously applied as indicated at 28 across the lower end of the strips and in and about the sheath seals between the sheath and the grooves 15 and 16 in the strips 13 and 14 to prevent ingress of molten metal into the grooves. The refractory sheath not only forms a support for the elements 20 and 21, but serves the important function of electrically insulating thermocouple element 20 from thermocouple element 21 upon immersion of the assembly as a whole into a molten metal bath.

I have found with thermocouple assemblies, such as the assembly 19, which has just been described, there have been achieved temperature measurements within time interals shorter by a wholly different order than heretofore. Thus in making measurements of high temperature molten baths such as of molten iron, steel and alloys, temperatures, as measured by thermocouple assemblies embodying the present invention, have been more accurate and usually higher by as much as 10° or more than temperatures measured by thermocouples available on the market prior to the present invention. Studies have indicated that the prior measurements were in error, due to insufficient time to attain an equilibrium temperature. When measuring molten bath temperatures using prior equipment, it is imperative that the temperature measurements be made in the minimum length of time to reduce the rate of destruction of the thermocouple elements.

The thermocouple assembly 19 achieves the higher order of speeded measurement as a result of a number of contributing factors. By utilizing capillary tubing 23 of refractory material as the sole means of electrically insulating the legs or elements of the thermocouple and selected on the basis of the temperatures to which it is to be exposed, which refractory material is transparent to heat radiation, there is not only avoided thermal lag due to the absence of other insulators and the resulting small mass and lower heat capacity of the resultant structure, but the tubing itself also provides for radiant transfer of heat directly to the thermo-electric junction in all directions. The capilliary tubing 23 provides a relatively large area for its mass and provides relatively high rate of transfer of heat to the thermocouple elements 20 and 21 and to the junction 22. This is to be contrasted with refractory caps within which thermocouples have heretofore been disposed since, in accordance with the present invention, each leg of the tubular member 23 is completely surrounded by the molten bath. Thus there is high heat transfer from every exposed portion of the tubing. There is avoided loss of heat away from the thermo-electric junction by conduction lengthwise of the thermocouple elements. The thermocouple elements 20 and 21 themselves may be reduced in cross section further to reduce the mass to be heated. Advantage may be taken of a reduction in the cross section area of the thermocouple elements since the capillary tubing provides, through its lengths, mechanical support therefor, electrical insulation of them and of the thermo-electric junction from the molten bath. The capillary tubing lends itself to evacuation or filling with inert gas to protect the thermocouple materials from chemical action. This construction also permits distortion of the tube as by heating and drawing for more intimate physical contact between the inner walls of the tube and the thermocouple materials. The thermocouple elements extend outwardly of the opposite ends of the tubing and are connected into a measuring circuit.

In the preferred form of the invention, the tubing 23 is in the shape of a return bend with the end portions of the respective legs anchored into or supported by a refractory body of low heat conductivity. The refractory body may be of heat-resistant ceramic material or it may be of other inexpensive materials normally not considered refractory but which are resistant to the molten baths as, for example, wood or wood-like material which in use is charred to carbon but nevertheless resists destruction for a time adequate for temperature measurements of the molten steel or other materials. In addition to having the characteristic of low heat conductivity the body should have the physical ability of retaining mechanical rigidity for at least several seconds at the temperature to be measured. For steels this temperature may be as high as about 3500° F.

The ends of sheath 23 within grooves 15 and 16 terminate within the grooves within one inch or less from the refractory-coated surface 28, and the respective elements 20 and 21 project slightly beyond the ends of the sheath and are electrically connected to the lead-wire structures 17 and 18. As indicated at 24, the electrical connections may be made by welding. Satisfactory temperature measurements have been made with embodiments of the invention with thermocouple elements so short that the measuring junction 22 is but ¾" from the refractory face 28 and in which the elements extend into grooves 15 and 16 about the same amount. In the same embodiment of the invention, the grooves 15 and 16 were laterally spaced apart about one-half inch. Thus, the thermocouple elements 20 and 21 are short, preferably not exceeding about two inches. As hereinafter pointed out the thermocouple elements are of the fine-wire type having a size of the order of No. 30 B&S gauge. Platinum wire of No. 30 B&S gauge has a mass of 0.35 gram/ft. or approximately 0.03 gram/inch (Handbook of Chemistry and Physics, 31st edition, 1949). Thus by keeping the length of the thermocouple elements 20 and 21 to two inches or less the total mass of noble metal used in the pair of elements would be about 0.12 gram or less.

In order further to protect the thermocouple assembly 19, a metal cap 26 is shown with the strips 13 and 14 nesting therein and the thermocouple assembly 19 spaced from the closed end thereof. The metal cap 26 is rigidly secured to the strips 13 and 14 by any suitable means, such as nails 27. The cap not only prevents mechanical injury to the thermocouple assembly 19 during shipment and handling, but also protects the assembly from the slag floating on the top of the molten bath, such as steel. The cap 26 is preferably thin-walled so that it will rather quickly melt away after immersion into molten steel, but not until the assembly as a whole has been plunged past the layer of slag at the surface of the bath. Thus at the time the cap 26 melts away or is consumed, the thermocouple assembly 19 will have been moved to a selected subsurface level of the bath at which the temperature measurement is to be taken. Caps made of 28-gauge mild carbon steel sheets have been found satisfactory for molten steel. The rapidity with which the cap 26 is melted in the steel may be increased by providing in it a plurality of small perforations 26a which while permitting ingress of molten steel are too small to permit ingress of slag. The outer surfaces of the strips of wood forming the outer surface of the assembly as a whole may be coated with a refractory cement to minimize burning of the wood.

A refractory aluminum oxide cement available on the market under the name of "Alundum" will be satisfactory both for the outer coating and to form the seal between the refractory sheath 23 and the grooves 15 and 16.

The lead-wire structures 17 and 18 are selected to be of material such that they will provide compensating lead wires for the thermocouple. Those skilled in the art will understand that if the element 20 be of platinum and the element 21 of an alloy of platinum plus 10% rhodium, the lead wire 18 will comprise an alloy of nickel and copper (98% copper and 2% nickel), and the lead wire 17 will be made of copper. When thermocouples of other materials are utilized, the lead wires may be correspondingly changed to provide the desired compensation.

Further in accordance with the present invention, provisions are made so that the temperatures of the regions in which the electrical connections are made between the thermocouple elements 20 and 21 with their respective lead-wire structures 18 and 17 do not exceed 400° F.

The provisions which accomplish the foregoing objective are as follows. The thermocouple elements 20 and 21 are of the fine-wire type, by which I mean they have a size of the order of No. 30 B&S gauge, while the lead-wire structures 17 and 18 are of the order of No. 16 B&S gauge. Wire of No. 30 B&S gauge has a diameter of 0.01003 inch or 10.03 mils and an area of 100.6 circular mils. In this modification the tube 23 had an internal diameter of about 1 millimeter and an outside diameter of about three millimeters. While the ratios of the cross-sectional areas between the thermocouple elements 20 and 21 and their respective lead-wire structures 18 and 17 are not critical, nevertheless, in this modification each lead-wire structure has a cross-sectional area several times greater than the cross-sectional area of the associated thermocouple elements. The lead-wire structures have the enlarged cross-sectional areas over a sufficient part of their lengths to establish a heat-absorbing capacity which is large compared with that of the thermocouple elements. Since the thermocouple elements are of fine wire and thus have small cross-sectional areas, there is only a low rate of heat flow along them to the regions 24 where they are connected to the lead wires 17 and 18. Thus by limiting the rate of flow of heat to a low order and by providing lead wires having relatively high heat storage capacity, the regions of connection 24 do not rise in temperature to any substantial degree, since the heat flowing thereto is conducted therefrom, or is absorbed, by the lead-wire structures. Thus the lead-wire structures may be considered as acting as a "heat sink" capable of taking the heat conducted by the thermocouple wires without an attendant rise of temperature approaching the undesirable upper limit of around 400° F. In FIGS. 2 and 3 the lead-wire structures are shown of uniform cross-sectional area, and such uniformity may frequently be utilized where the cost of the lead-wire structures is of a relatively low order. As a substitute for using an enlarged cross-section of compensating lead wire to form a heat sink one may employ a good thermal connection such as a good heat conducting cement between the connections 24 and the material of the body.

While the heat storage capacity is an important consideration, it will be understood that capacity need not be extremely large since the period of time during which the temperature measurements are made is of generally short duration, of the order of a few seconds.

In addition to the foregoing, the strips of wood 13 and 14 have low heat-transfer characteristics, wood being a recognized heat-insulating material of low heat conductivity. Therefore, the regions of connection 24 are heat-insulated regions. Thus the strips of wood have adequate strength for the handling of the unit, provide material which makes easy fabrication of the unit, and which contribute their heat-insulating properties to satisfactory measurements of the temperature of molten steel.

In use, the thermocouple unit or arrangement 10 of FIGS. 1–3, after connection to a measuring or exhibiting apparatus, is inserted into a furnace through a suitable opening in the furnace wall, and the end 11 is immersed in the molten metal. After the measurement of temperature, the unit of FIGS. 1–3 may be electrically disconnected from the exhibiting apparatus and dropped into the furnace to be consumed. Where the thermocouple elements 20, 21 are made of noble metal and it is desired to reclaim the elements as scrap, the unit may be withdrawn from the furnace for the purpose. In either event the thermocouple assembly is designed as an expendable unit, to be used only for a single measurement of temperature. Because of the need to use only short lengths of the nobel metals and the general economy of construction, the expendable character of the unit may be achieved.

It has been found that a quarter-inch thickness of wood will retard the flow of heat sufficiently to permit a temperature measurement of satisfactory accuracy to be made. While the outer layer of the wood will char at sub-surface levels, active combustion above the liquid level may be prevented if desired, by using a coating of refractory cement or the like.

While the strips 13 and 14 have been described as of wood, it is to be understood the invention is not limited thereto and that the terms wood and wood-like are to be taken in their generic sense to refer generally to woods of all kinds used for structural purposes and having adequate strength to be self-supporting and to handle a unit about eight feet long; and to include pressed wood and other materials having low orders of heat conductivity and the same ability to withstand high temperature over short periods of time.

Figure 4:
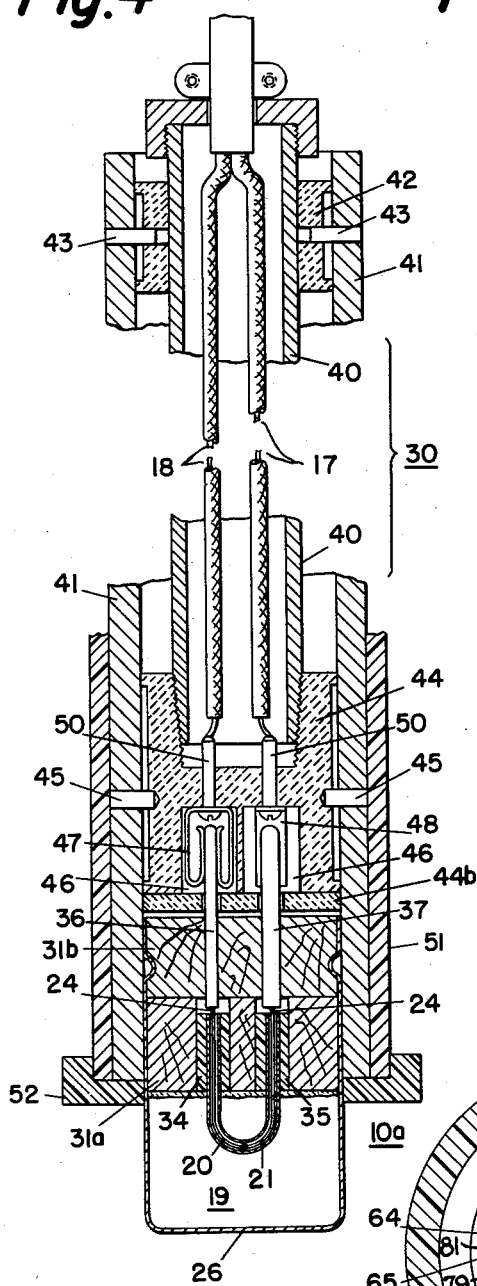
FIG. 4 is a cross-sectional view of another embodiment of the present invention disclosing means for effecting rapid mechanical and electrical connection of the thermocouple unit to a manipulating device.

In FIG. 4 there is disclosed an embodiment of the invention in which a thermocouple unit 10a of this "plug-in" type is adapted for quick mechanical and electrical connection to an end of a suitable manipulator structure 30. The plug-in thermocouple unit 10a comprises the expendable portion of the assembly. The thermocouple unit 10a includes body or supporting structure comprised of a lower block 31a and an upper block 31b formed of material having a low heat transfer characteristic. Blocks formed of wood such as hard maple have been found satisfactory. Alternatively, blocks 31a and 31b of the body may be formed of other suitable inexpensive material including hard paper with high resistance to heat flow and good mechanical or strength characteristics even after brief exposure to the high temperatures. Other materials which are satisfactory are ceramics and plastics which can be poured or molded and subsequently hardened and in which the ends of the quartz tube and the other internal elements of the unit 10a are supported. The lower block 31a is provided with a pair of spaced bores for accommodating the ends of the thermocouple assembly 19. The ends of the refractory sleeve 23, which encases the thermocouple, are firmly mounted within the bores by means including refractory cement or felt or paper sleeves 34, 35. The cement or sleeves 34, 35 serve to make assembly of the unit easy and help prevent ingress of molten metal. The exposed face of the lower block 31a from which the measuring junction of the thermocouple 19 extends may be coated with a suitable refractory cement to further prevent ingress of molten metal. As indicated, cap 26 is a close fit over the supporting structure 31. It may be secured in place by indenting with a punch or like tool.

The upper block 31b accommodates a pair of pins 36, 37 force-fitted or embedded therein and formed of compensating lead-wire material. The pins 36 and 37 are welded or otherwise secured to the ends of thermocouple elements 20, 21, after which the blocks are placed together and secured by dowels or the like, not shown.

The pins 36 and 37 may be differently shaped and/or oriented to provide polarized electromechanical connections to suitable connecting means to assure connection to corresponding materials.

The prefabricated plug-in thermocouple unit 10a is adapted to be received in the open end of a manipulating rod or holding structure 30 which is approximately eight feet in length to facilitate the immersion of the thermocouple unit into a molten metal bath. The manipulating rod is shown comprised of two concentric steel pipes 40 and 41 mounted in spaced relation by a series of annular refractory rings or spacers 42, only one of the rings here being shown. It is to be understood that other rings are disposed in spaced relation along the length of the manipulating rod. If desired, the rings may be provided with undercuts to restrict the flow of heat from pipe 41 to pipe 40.

The rings 42 are rigidly secured to the outer pipe 41 by pins 43. The engagement between the rings 42 and the inner pipe 40 is in the nature of a slidable contact in order that relative expansion of the inner and outer pipes during immersion of the manipulating rod into the molten metal will not create stresses within the manipulating rod structure.

The lower end of the inner pipe 40 is threadably secured in a lower terminal block 44 which is fastened to the outer pipe 41 by pins 45 which block restricts the flow of heat from pipe 41 to pipe 40. The lower end of terminal block 44, which may be made of a dense refractory, is provided with a pair of counter-bored holes 46 having mounted therein spring-type contact members 47 and 48. As illustrated, the contact members provide a polarized arrangement due to a slight difference in diameter of holes in a masking plate 44b through which must pass the pins 36 and 37. The contact members are made of compensating lead-wire material, the material of contact member 47 being the same as that of the pin 36, while the material of the contact member 48 is the same as the material of the pin 37. With this arrangement, the continuity of the thermocouple circuit is maintained. The pins 50, rigidly securing the contact members 47 and 48 within their respective counter-bores, are also made of compensating lead-wire material, preferably welded to members 47 and 48, and serve to extend the thermocouple circuit to a position adjacent the end of the inner pipe 40 at which point compensating lead-wires 17 and 18 are connected to the pins, as by welding. Lead-wires 17 and 18 may be covered with ceramic or other suitable heat-resistant material. If desired, lead-wires 17 and 18 may be supported within the inner pipe 40 by a series of multi-holed porcelain or other refractory-type insulators.

The thermocouple unit 10a should have a very slight taper so that it fits like a cork or bottle stopper into the outer pipe 41. Such an arrangement provides for a close fit to prevent the seepage of molten material between the adjacent walls of the outer pipe 41 and the cover or cap 26 of the thermocouple unit. Deterioration of the outer pipe 41 can be retarded and the removal of slag encrustation made easier if heavy paper sleeves and/or a paper end-cap are employed. Such an arrangement is illustrated in FIG. 4 as comprised of the sleeve 51 and washer 52. The sleeve 51 and the washer 52, which are expendable, may be of paper about ¼" thick. The washer 52 may be either flat or cup-shaped.

From the foregoing it will be seen that the pins 36 and 37 are electrically connected to the thermocouple 19 and serve as coupling structure which cooperates with contact members 47 and 48 to provide quick releasable mechanical and electrical connection of the thermocouple unit 10a with a manipulator rod. Since the mechanical and electrical connection of the unit to the rod is accomplished without the need of tools, the unit 10a is referred to as "plug-in" unit. It is a prefabricated unit and by reason of its low cost of construction it is expendable and may be disposed of after a temperature measurement has been made and then replaced by a similar prefabricated unit.

Figure 5:
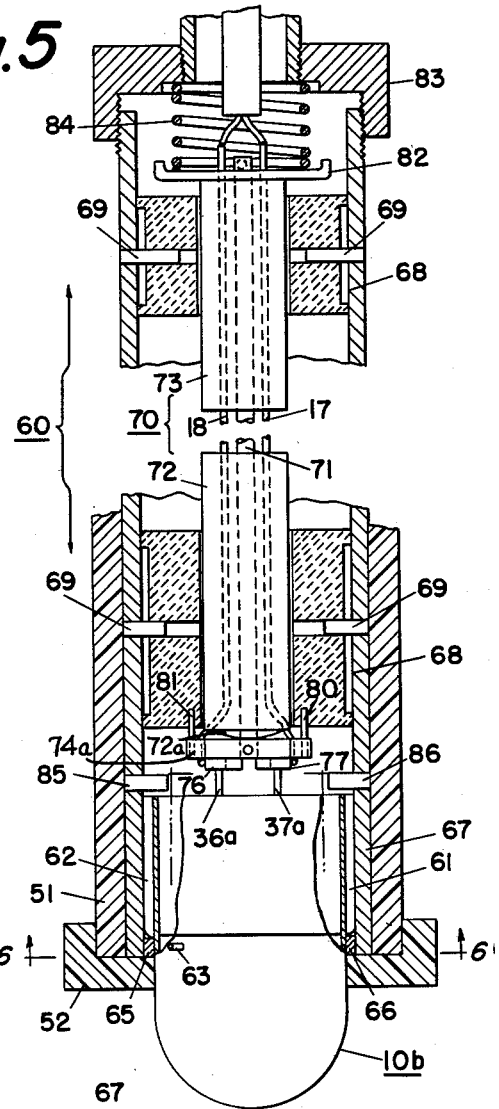
FIG. 5 is a cross-sectional view of yet another modification of the present invention.
Figure 6:
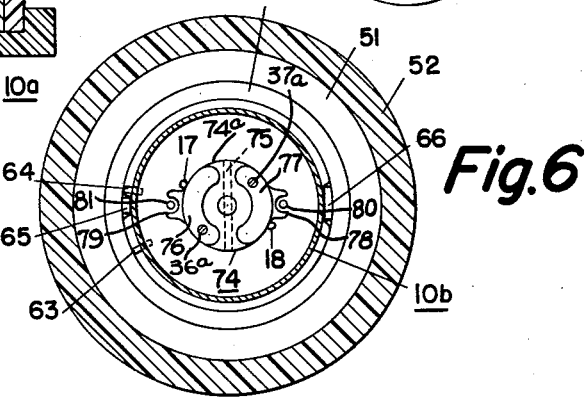
FIG. 6 is a cross-sectional view taken along a line substantially corresponding to line 6—6 of FIG. 5.

In FIGS. 5 and 6 there is illustrated yet another modification of the present invention in which an expendable prefabricated thermocouple unit 10b, similar in many respects to the expendable unit 10a of FIG. 4, is shown mounted within a manipulating or holding structure 60. The expendable thermocouple unit 10b differs from the unit 10a in that its sides include recessed or channeled portions 61, 62 and pins 63 and 64 (FIG. 6) which cooperate with pins or guide members 65 and 66 secured to the inner surface of the tube 67 to properly position and lock the thermocouple unit within the manipulating structure 60.

The manipulating structure 60 is comprised of the pipe 67, which may be steel or steel alloy, within which are mounted a plurality of spaced rings 68 formed of a refractory material similar to those of FIG. 4. The rings 68 are secured to the tube 67 by pins 69 and serve to support an assembly 70 which is comprised of a metal rod 71, preferably stainless steel, upon which are threaded a plurality of multi-holed refractory electrical insulating members 72 and 73. It will be understood that there are more than two of the insulating members present in the assembly, the others being omitted for purposes of clarity. Threaded through the holes of the members 72, 73 are a pair of thermocouple extension lead-wires 17 and 18, one being composed of commercially pure copper and the other being composed of an alloy of copper and nickel as previously described. 16 B&S gauge wire has been found satisfactory substantially to eliminate relative rotation of multi-holed insulators 72 and 73 about rod 71 and thereby prevent the possibility of short circuits in assembly 70.

The lowermost insulator 72 differs from the other insulators in assembly 70, as represented by the insulator 73, in that its lower end is provided with a convex surface 72a for the purpose to be hereinafter described. A contact assembly 74 including a plate 74a of insulating material such as dense refractory is attached to the end of rod 71 by a pin 75 and has its upper surface in contact with the convex portion 72a of the insulator 72. The contact assembly 74 includes a pair of contact segments 76 and 77 formed of compensating lead-wire material which are to be contacted by the lead-wire structure 36a and 37a extending from one end of the thermocouple unit 10b. The contact segments 76 and 77 are electrically connected to lead-wires 17 and 18 which emerge from the bottom portion of the insulator 72 through angularly displaced holes connecting with the through holes of the insulator. The connection, between the lead-wires 17 and 18 and the respective contact segments 77 and 76, may be made by any known means, as by use of short lengths of stranded flexible lead-wire material welded or brazed thereto. The contact assembly 74 is provided with oppositely disposed recesses 78 and 79 which receive guide pins 80 and 81 to prevent rotation of the assembly 74.

The upper end of the assembly 70 includes a spring-receiving member 82 which is held on the rod 71 by pin 82a. The spring-receiving member 82 cooperates with a cap 83 threaded on the pipe or tube 67 and a spring 84 is provided to urge the assembly 70 downwardly. The extent of downward movement of the assembly 70 is limited by engagement of the spring-receiving member 82 with the spacer ring 68. The extent of force exerted against the assembly 70 by the spring 84 may be varied by adjusting the cap 83 along the threaded portion of the tube or pipe 67.

When the expendable thermocouple unit 10b is inserted in the lower end of the pipe 67, by aligning its recesses 61 and 62 respectively with the pins 66 and 65, the compensating lead-wire structures 36a and 37a engage their respective contact members, segments 76 and 77. The contact assembly 74 is adapted to rotate to a limited extent about the pin 75 and against the convex portion 72a of the insulator 72 in order to compensate for any possible differences in the lengths of structures 36a and 37a. Continued movement of the thermocouple unit into the end recess of the tube 67 and to a point where the lower end of the enlarged upper portion of the unit 10b is wholly beyond the pins 65 and 66, will cause the assembly 70 to move upwardly against the force of spring 84. The upper movement of unit 10b into pipe 67 is limited by stop pins 85 and 86. The stop pins 85 and 86 are optional inasmuch as the contact assembly 74 will operate as a limiting means by engagement thereof with lower spacer ring 68.

The expendable element 10b is positively locked within holding structure 60 by partially rotating the unit so that the lower end of its enlarged upper portion rests upon the aligning pins 65 and 66. The extent of rotation of the unit is limited by engagement of one of the pins 63 with aligning pin 65. The thermocouple assembly is now ready for use except for applying a protective seal of quick-drying refractory cement around the joint between unit 10b and tube 67. If desired, a paper sleeve and cap similar to those mentioned in connection with the description of FIG. 4 may be employed.

After the taking of a temperature measurement of a molten bath of metal, the assembly or arrangement is withdrawn from the furnace and the expendable unit is removed from manipulating structure 60, by rotating the unit until the pin 64 engages the aligning pin 65. At this time the recesses 61 and 62 of unit 10b will be in alignment with pins 66 and 65 and the unit may be readily withdrawn from pipe 67.

It shall be understood the invention is not limited to the specific arrangements shown, and that changes and modifications may be made within the scope of the appended claims.

What is claimed is:

1. An expendable thermocouple assembly of the immersion type for use in measuring the temperature of molten metals, comprising a thermocouple having elements of short length and small cross-sectional area joined together at one end to form a measuring junction, supporting structure of electrically non-conductive material having a high-temperature destruction point and a low heat transfer characteristic into which the free terminal ends of said elements extend, a heat-refractory electrically non-conductive sheath member enclosing all portions of said elements extending outwardly from said structure and a portion of said elements extending into said supporting structure, a seal between said sheath member and said supporting structure to prevent ingress of molten metal into said structure, lead wires extending into said supporting structure and electrically connected to the free terminal ends of said elements in a region inwardly spaced from said seal, said region being in an immersible portion of said supporting structure, the diameter of said lead wires being large as compared with the diameter of said thermocouple elements and being several times greater for rapid absorption of heat to prevent a material rise in temperature at the points of said electrical connections between said lead wires and said terminal ends of said elements due to the flow of heat along said thermocouple elements upon immersion thereof in molten metal, and a fusible enclosure surrounding said measuring junction and the thermocouple elements extending therefrom to protect them during immersion into molten metal, said enclosure being rapidly fused or melted by the molten metal to expose the refractory-enclosed measuring junction to the molten metal, said enclosure delaying the exposure of said thermocouple to the molten metal during the time it is moved from the surface of the molten metal to a selected temperature-measuring subsurface level thereof.

2. An expendable thermocouple assembly according to claim 1 including as an expendable portion thereof heavy paper tubular means, said supporting structure having its end opposite from said fusible enclosure disposed in one end of said heavy paper tubular means, the latter surrounding said lead wires for a substantial length and aiding in insulating said lead wires from said molten metal during immersion.

3. An expendable thermocouple assembly of the immersion type for use in measuring the temperature of molten metals, comprising a thermocouple having noble metal elements of short length and small cross-sectional area joined together at one end to form a measuring junction, supporting structure of electrically non-conductive material having a low heat-transfer characteristic into which the free terminal ends of said elements extend, a heat-refractory electrically non-conductive sheath member enclosing said elements and said junction, a seal between said sheath member and said supporting structure to prevent ingress of molten metal into said structure, lead-wire structures extending into said supporting structure and joined with the free terminal ends of said elements in a region inwardly spaced from said seal, said region being in an immersible portion of said supporting structure, the diameter of said lead-wire structures being large as compared with the diameter of said thermocouple elements and being several times greater for rapid conduction of heat from the junctions between said lead-wire structures and said terminal ends of said elements to minimize the temperature rise of said junctions upon immersion of said supporting structure in molten metal, and a fusible enclosure surrounding said measuring junction and the thermocouple elements extending therefrom to protect them during immersion into molten metal, said enclosure being rapidly fused or melted by the molten metal to expose the refractory-enclosed measuring junction to the molten metal, said enclosure delaying the exposure of said thermocouple to the molten metal during the time it is moved from the surface of the molten metal to a selected temperature-measuring subsurface level thereof.

4. A prefabricated and precalibrated expendable thermocouple assembly for connection to an exhibiting apparatus through a heat-resistant manipulating device which is used for immersing the thermocouple assembly into a molten metal bath, said assembly comprising a supporting member having a pair of spaced passageways extending from one end to an opposite end thereof, a bent hollow silica tube having its ends respectively rigidly mounted in said spaced passageways and having its body portion spaced from the adjacent end of said supporting member, thermocouple elements forming a thermocouple having its measuring junction within said body portion of said tube and having end portions extending beyond the ends of said tube into said passageways of said supporting member, the length of said thermocouple elements from said measuring junction to the ends thereof not exceeding two inches, a pair of compensating lead-wire structures electrically connected to the ends of said thermocouple within the confines of said supporting member and extending along said passageways to a position beyond the opposite end of said supporting member for connection of said assembly to the exhibiting apparatus, the mass of each of said lead-wire structures greatly exceeding the mass of each of said thermocouple elements, and a fusible cap surrounding said measuring junction and the exposed portion of said silica tube to protect them during immersion into molten metal, said enclosure being rapidly fused or melted by the molten metal to expose to the molten metal said measuring junction while enclosed in said tube.

5. An expendable thermocouple assembly for use in measuring the temperature of molten metals, comprising a thermocouple having elements of short length and small cross-sectional area joined together at one end to form a measuring junction, said elements having lengths not exceeding two inches and cross-sections not exceeding about one hundred circular mils, supporting structure of electrically non-conductive material having a low heat-transfer characteristic into which the free terminal ends of said elements extend, a heat-refractory electrically non-conductive sheath member enclosing said elements and said junction, a seal between said sheath member and said supporting structure to prevent ingress of molten metal into said structure, lead wires extending into said supporting structure and electrically connected to the free terminal ends of said elements in a region inwardly spaced from said seal, the cross-section of said lead wires being large as compared with the cross-section of said thermocouple elements and being several times greater for rapid conduction of heat from the regions of said electrical connections between said lead wires and said terminal ends of said elements to minimize their temperature rise upon immersion of said supporting structure in molten metal, and a fusible enclosure surrounding said measuring junction and the thermocouple elements extending therefrom to protect them during immersion into molten metal, said enclosure being fused or melted by the molten metal to expose the refractory-enclosed measuring junction to the molten metal.

6. An expendable thermocouple assembly of the immersion type for use in measuring the temperature of molten metals, comprising a supporting structure of wood having channel means extending lengthwise of said structure, fine-wire thermocouple elements of noble metal respectively extending into said channel means and outwardly a short distance from the end of said structure, said elements being joined together to form a measuring junction in spaced relation with said structure, a silica sheath member enclosing said elements and said junction, a seal between said sheath member and said supporting structure to prevent ingress of molten metal into said structure, lead wires extending into said supporting structure and electrically connected to the free terminal ends of said elements to form junctions in a region inwardly spaced from said seal, said junctions being in an immersible portion of said supporting structure, said lead wires being of larger cross section than said thermocouple elements for rapid conduction of heat from the regions of said electrical connections between said lead wires and said terminal ends of said elements to minimize the temperature rise of said junctions upon immersion of said supporting structure in molten metal, and a fusible enclosure surrounding said measuring junction and the thermocouple elements extending therefrom to protect them during immersion into molten metal, said enclosure being rapidly fused or melted by the molten metal to expose the refractory-enclosed measuring junction to the molten metal, said enclosure delaying the exposure of said thermocouple to the molten metal during the time it is moved from the surface of the molten metal to a selected temperature-measuring subsurface level thereof.

7. An expendable thermocouple assembly of the immersion type for use in measuring the temperature of molten metals, comprising a supporting structure of wood having channel means extending lengthwise of said structure, fine-wire thermocouple elements of noble metal respectively extending into said channel means and outwardly a short distance from the end of said structure, said elements being joined together to form a measuring junction in spaced relation with said structure, a silica sheath member enclosing said elements and said junction, a seal consisting of aluminum oxide cement intimately coating the area of said supporting structure and the contiguous portion of said silica sheath member between said sheath member and said supporting structure to prevent ingress of molten metal into said structure, lead wires extending into said supporting structure and electrically connected to the free terminal ends of said elements to form junctions in a region inwardly spaced from said seal, said junctions being in an immersible portion of said supporting structure, said lead wires being of larger cross section than said thermocouple elements for rapid conduction of heat from the regions of said electrical connections between said lead wires and said terminal ends of said elements to minimize the temperature rise of said junctions upon immersion of said supporting structure in molten metal, and a fusible enclosure surrounding said measuring junction and the thermocouple elements extending therefrom to protect them during immersion into molten metal, said enclosure being rapidly fused or melted by the molten metal to expose the refractory-enclosed measuring junction to the molten metal, said enclosure delaying the exposure of said thermocouple to the molten metal during the time it is moved from the surface of the molten metal to a selected temperature-measuring subsurface level thereof.

8. As an article of manufacture, an expendable thermocouple unit for use in the immersion measurement of high temperature molten material comprising a unitary body structure of material having wood-like rigidity and of heat insulating properties, thermocouple elements having portions which extend into said body structure to be supported thereby and portions which extend outwardly therefrom into electrical connection one with the other to form a measuring junction, electrical conductors disposed within said body structure to be supported thereby and electrically connected to said thermocouple elements, said supporting structure in the measurement of the temperature of said molten material being immersed therein at least to a depth which includes the points at which said electrical conductors are connected to said thermocouple elements, a U-shaped refractory tube enclosing the portions of said thermocouple elements which extend outwardly of said body structure, said U-shaped refractory tube having its end portions extending into and supported from said body structure for protecting said measuring junction and said outwardly extending portions of said thermocouple elements.

9. The combination with said expendable thermocouple unit of claim 8 including heavy paper tubular means, said expendable thermocouple unit being disposed in one end of said heavy paper tubular means, the latter surrounding said electrical connections formed between said thermocouple elements and said electrical conductors and aiding in insulating said connections from said molten material, said heavy paper tubular means being expendable along with said thermocouple unit.

10. As an article of manufacture, an electrically insulated thermocouple structure having rapid response for immersion in fluids comprising an electrically insulating refractory tube enclosing thermocouple elements serially connected to form a thermoelectric junction intermediate the ends of said tube with one of said elements extending toward one end of said tube and the other of said elements extending toward the other end of said tube, said tube being bent with portions thereof spaced apart so that the intermediate portion of said tube containing said electrically insulated thermo-electric junction may be immersed in and surrounded by said fluid.

11. An immersion-type thermocouple for the measurement of molten bath temperatures, comprising an effectively U-shaped bent tube of quartz, at least two elements of thermocouple material disposed within said tube and within the bend of the tube joined together at one of their ends to form a measuring junction with their opposite ends extending respectively from the opposite ends of said tube, and structure having leads connected to said thermocouple elements for supporting said tube in spaced relation therewith to bring into heat transfer relation the molten bath with the whole of the external surface of said tube which is supported in said spaced relation.

12. A thermocouple assembly comprising an effectively U-shaped bent tube of electrically insulating refractory material, said material being transparent to heat or thermal radiation, two elements of thermocouple material disposed serially within said tube and joined together intermediate the ends of said U-shaped tube to form a thermoelectric junction, and structure of low heat conductivity supporting said tube and said thermocouple elements in spaced relation therewith, said structure including means for connecting said thermocouple into a measuring circuit.

13. A thermocouple assembly according to claim 12 in which at one end of the said tube there is means indicative of polarity.

14. A thermocouple assembly comprising a return bend tube of electrically insulating refractory material having two connected legs spaced apart at said return bend, said material being transparent to heat or thermal radiation, two elements of thermocouple material respectively extending into said legs, said two elements being joined together at end portions thereof to form within said return bend tube a thermoelectric junction, said assembly being characterized by the engagement of the inner walls of the tube by the thermocouple elements to aid in the transfer of heat through the tube to the thermoelectric junction, and structure of low heat conductivity supporting the end portions of the legs of said return bend tube with said thermoelectric junction spaced outwardly therefrom.

15. A thermocouple assembly comprising an effectively U-shaped bent electrically insulating refractory tube, two thermocouple elements each respectively extending inwardly of said U-shaped tube from opposite ends thereof, said thermocouple elements being joined together within said U-shaped tube to form a thermoelectric junction, said thermocouple elements extending outwardly of the opposite ends of said U-shaped tube for connection into a measuring circuit.

16. A fast-acting thermocouple assembly comprising a body member, a refractory tube of electrically insulating material having the opposite ends thereof disposed within said body member, the intermediate portion of said tube being disposed outside of said body member and spaced therefrom, and two thermocouple elements each respectively extending inwardly of said tube from said opposite ends thereof, said thermocouple elements being joined together within the intermediate portion of said tube to form a thermoelectric junction, and electrical conductors having portions disposed within said body member and respectively connected to said elements in a region adjacent said opposite ends of said tube.

17. A molten bath temperature-measuring assembly for immersion pyrometry of temperatures ranging up to about 3500° F. comprising an elongated manipulator one end of which is immersible below the surface of a high temperature molten bath and constitutes the immersion end thereof, a detachable plug-in temperature sensing unit of short length, said immersion end of said manipulator including electromechanical coupling structure engaging corresponding structure of said detachable plug-in temperature sensing unit at a sub-surface level in the bath, and a heavy paper sleeve slideably carried by and surrounding said immersion end of said manipulator in overlapping relation with said electromechanical coupling structure to provide protection for said immersion end when immersed below the surface of the molten bath.

18. As an article of manufacture, an expendable thermocouple unit for use in the immersion measurement of high temperatures, comprising a body structure including a pair of complementary sections, means for holding said sections together, thermocouple elements having portions which extend into said body structure and portions which extend outwardly therefrom into electrical connection one with the other to form a permanent measuring junction, and electrical conductors disposed within said body structure to be supported thereby and permanently electrically connected to said thermocouple elements at points in said structure to be immersed, said points of electrical connection being along the parting line between said sections of said body structure, said electrical conductors having in respect to said body structure exposed portions for connection to a measuring system.

19. An expendable thermocouple assembly of the immersion type for use in measuring temperature of molten materials such as molten metals, comprising a thermocouple having elements of short length and small cross-sectional area joined together at one end to form a measuring junction, supporting structure of electrically non-conductive material having a low heat-transfer characteristic into which the free terminal ends of said elements extend, a heat-refractory electrically non-conductive sheath member enclosing said junction and at least the portions of said elements which extend outwardly from said structure, means for mounting said sheath member in said supporting structure to prevent ingress of molten metal into said structure, electrical conductors extending into said supporting structure and joined with the free terminal ends of said elements in a region located inwardly of said supporting structure, said region being in an immersible portion of said supporting structure, and an enclosure surrounding said measuring junction and said thermocouple elements extending therefrom to protect them during immersion into the molten metal, said enclosure being rapidly destroyed by the molten metal to expose the refractory-enclosed measuring junction to the molten metal, said enclosure delaying the exposure of said thermocouple to the molten metal during the time it is moved from the surface of the molten metal to a selected temperature-measuring subsurface level thereof.

20. A thermocouple assembly comprising a bent tube of refractory material, said material being transparent to heat or thermal radiation, two elements of thermocouple material disposed serially within said tube and joined together intermediate the ends of said tube to form a thermoelectric junction, structure of low heat conductivity supporting said tube and said thermocouple elements in spaced relation therewith, said structure including means for connecting said thermocouple into a measuring circuit, and a rigid housing in spaced relation surrounding said tube and secured to said structure, said housing being of a material which is destroyed by high temperature refractory baths to expose said tube to said bath after penetration to a sub-surface location of said bath.

21. An article of manufacture for use in measuring the temperature of molten material at a high temperature by immersion of a heat-responsive element therein comprising an expendable permanently self-contained unit including as integral elements thereof: (a) a housing consisting of a rigid refractory body having the characteristics of retarding the flow of heat inwardly thereof and maintaining its rigidity for several seconds upon immersion in the material, (b) temperature-sensitive means having at least one portion which extends into said housing for protection from the heat of the material and a heat-responsive portion which is unprotected from said heat, (c) a refractory element permanently secured to said housing and cooperating therewith to form an enclosure for said heat-responsive portion of said temperature-sensitive means, said refractory element having the characteristics of freely transmitting heat from the material to said heat-responsive portion of said temperature-sensitive means and of electrically insulating said heat-responsive portion of said temperature-sensitive means from the material, and (d) electrical conductors supported in fixed position by said housing and permanently electrically-connected to said temperature-responsive means, said electrical conductors having in respect to said housing exposed portions for connection to a measuring system, said self-contained unit being expendable after a single measurement and replaceable by a new unit, a consumable enclosure supported by said housing and surrounding said refractory element which encloses said heat-responsive portion of said temperature-sensitive means to protect them during insertion into the material, and means providing a passageway between the interior and exterior of said consumable enclosure, said enclosure being rapidly consumed by immersion in the material to expose the refractory-enclosed heat-responsive portion to the material.

22. A measuring assembly for immersion measurements comprising an elongated manipulating unit including tubular means having an immersible end portion, a non-metallic outermost detachable sleeve slideably carried on the outer surface of said tubular means and extending around said immersible end portion, a pair of leadwires extending through said tubular means to a location near said immersible end portion, said leadwires being connected to a first plug-in contact structure secured at said immersible end portion, and an immersible plug-in sensing unit including a second plug-in contact structure engageable with said first plug-in contact structure of said manipulating unit and including temperature sensing means within an electrically insulating heat-transmitting refractory tube, said second plug-in contact structure and said refractory tube being respectively supported by closely spaced block members, said non-metallic sleeve extending over both of said plug-in contact structures and at least a portion of said block member which supports said refractory tube, said block members serving as a plug to prevent flow of material into the immersion end of said manipulating unit.

23. An expendable thermocouple unit for use in the immersion measurement of high temperatures and adapted for rapid mechanical and electrical connection and disconnection with respect to electrical conduction means of compensating leadwire material supported within manipulating structure for said unit, said unit comprising body structure having an immersible portion including material retarding the flow of heat from the exterior to the interior thereof, thermocouple elements having portions which extend into said immersible portion of said body structure to be supported thereby and portions which extend out of said immersible portion into electrical connection one with the other to form a measuring junction, e'ectrical conductors of compensating leadwire material disposed within said body structure supported thereby and electrically connected to said thermocouple elements within said immersible portion of said body structure at a normally submerged region, said electrical conductors extending toward the end of said body structure opposite from said measuring junction and terminating in electrical contact structure, and means including said electrical contact structure providing a separable electro-mechanical connection between said body structure and the manipulating structure.

24. A temperature measuring unit for immersion pyrometry of temperatures ranging up to about 3500° F. comprising a block of electrically non-conductive heat-insulating material having an immersible end face, a thermocouple having thermocouple elements of short length and small cross section extending outwardly a short distance from said immersible end face of said block and their ends joined to form a hot junction with the other ends of said elements extending a short distance into said block and shielded from heat by said block, an electrically insulating heat-transmitting refractory sheath affixed to said block and together therewith encasing the entire outwardly extending portion of said thermocouple, and electrical conductors of material different from the material of said thermocouple connected within said block to said thermocouple elements and extending through said block to the other end face thereof for connection to a measuring instrument.

25. A temperature measuring unit for immersion pyrometry of temperatures ranging up to about 3500° F. comprising a block of heat-insulating material having an immersible end face, temperature-sensitive means including as a maximum amount 0.12 gram of noble material having a heat-responsive portion extending outwardly from said immersible end face of said block and having another portion extending a short distance into said block and shielded from heat by said block, an electrically insulating heat transmitting refractory sheath affixed to said block and together therewith encasing the entire outwardly extending portion of said temperature-sensitive means, and electrical conductors of material different from the noble material of said temperture-sensitive means extending into and through a portion of said block from the other end face thereof and connected within the block to said other portion of said temperature-sensitive means, said electrical conductors being accessible at said other end face for connection to a measuring instrument.

26. For use with a manipulator in measuring temperature by immersion pyrometry, the subcombination of a plug-in unit comprising a block of electrically non-conductive heat-insulating material having an immersible end face, a thermocouple having thermocouple elements of short length and small cross section extending outwardly from said immersible end face of said block and their ends joined to form a hot junction with the other free ends of said elements extending into said block and shielded from heat by said block, an electrically insulating heat-transmitting refractory sheath affixed to said block and together therewith encasing the entire outwardly extending portion of said thermocouple, and electrical conductors of material different from the material of said thermocouple connected to said free ends of said elements and shielded from heat by said block, said electrical conductors terminating in electromechanical plug-in coupling structure for ready attachment of said unit to a manipulator.

27. An expendable thermocouple assembly of the immersion type for use in measuring temperature of molten material, comprising a thermocouple having elements of short length and small cross-sectional area joined together at one end to form a measuring junction, supporting structure of electrically non-conductive material having a low heat-transfer characteristic into which the free terminal ends of said elements extend, heat-refractory electrically non-conductive heat-transmitting material enclosing said junction and at least the portions of said elements which extend outwardly from said structure mounted with respect to said supporting structure to prevent ingress of molten material into said structure, electrical conductors extending into said supporting structure and joined with the free terminal ends of said elements in a region located inwardly of said supporting structure, said region being in an immersible portion of said supporting structure, and heavy paper tubular means having an end into which said supporting structure and said electrical conductors extend, said measuring junction extending outwardly of said end for exposure to the heat of the molten material.

28. An expendable immersion high-temperature sensing unit comprising a short supporting block of heat-insulating refractory material, thermocouple elements of short length and small cross section each having one of their ends extending into one end of said block and supported thereby and their other ends extending out of said one end of said block and joined together to form a measuring junction, electrical conductors respectively connected to said ends of said thermocouple elements at locations protected from heat by said block, said electrical conductors each having a terminal portion for connection to a measuring circuit, and tubular means of heat-insulating material having a length several times as great as that of said block and surrounding said electrical conductors, said block forming a plug at one end of said tubular means with said measuring junction extending out of said one end of said tubular means for exposure to heat.

29. An article of manufacture for use in measuring the temperature of molten material at a high temperature by immersion of a heat-responsive element therein comprising an expendable permanently self-contained unit including as integral elements thereof: (a) a housing consisting of a rigid body having the characteristics of retarding the flow of heat inwardly thereof and maintaining its rigidity for several seconds upon immersion in the material, (b) temperature-sensitive means having at least one portion which extends into said housing for protection from the heat of the material and a heat-responsive portion which is unprotected from said heat, (c) refractory means permanently secured to said housing and cooperating therewith to form an enclosure for said heat-responsive portion of said temperature-sensitive means, said refractory means having the characteristics of freely transmitting heat from the material to said heat-responsive portion of said temperature-sensitive means and of electrically insulating said heat-responsive portion of said temperature-sensitive means from the molten material, and (d) electrical conductors supported in fixed position by said housing and therein permanently electrically-connected to said temperature-sensitive means, said electrical conductors having in respect to said housing exposed portions for connection to a measuring system, and heavy paper tubular means having an open end into which said housing and said electrical conductors of said self-contained unit extend, said refractory means extending outwardly of said open end of said heavy paper tubular means for exposure of said heat-responsive portion of said temperature-sensitive means to the heat of the molten material, said self-contained unit and said heavy paper tubular means being expendable after a single measurement and replaceable by a new unit and paper tubular means.

30. An article of manufacture for use in measuring the temperature of molten material at a high temperature by immersion of a heat-responsive element therein comprising an expendable permanently self-contained unit including as integral elements thereof: (a) a housing consisting of a rigid body having the characteristics of retarding the flow of heat inwardly thereof and maintaining its rigidity for several seconds upon immersion in the material, (b) temperature-sensitive means having at least one portion which extends into said housing for protection from the heat of the material and a heat-responsive portion which is unprotected from said heat, (c) electrical conductors supported in fixed position by said housing and therein permanently electrically-connected to said temperature-responsive means, said electrical conductors having in respect to said housing exposed portions for connection to a measuring system, and (d) a consumable enclosure supported by said housing and surrounding said temperature-sensitive means to protect it during insertion into the material, said enclosure being rapidly consumed by immersion in the material to expose said heat-responsive portion to the material, and heavy paper tubular means having an open end into which said housing and said electrical conductors of said self-contained unit extend, said consumable enclosure extending outwardly of said open end of said heavy paper tubular means for exposure of said heat-responsive portion of said temperature-sensitive means to the heat of the molten material, said self-contained unit and said heavy paper tubular means being expendable after a single measurement and replaceable by a new unit and paper tubular means.

31. For use with a manipulator in measuring the temperature of a bath of molten material or the like by immersion pyrometry the subcombination comprising a thermocouple having elements of short length and small cross-sectional area joined together at one end to form a measuring junction, supporting structure having at least an end immersible in the bath, said end including electrically non-conductive material having a low heat-transfer characteristic into which the free terminal ends of said elements extend and terminate in a heat-insulated region, a heat-refractory electrically non-conductive heat-transmitting sheath member enclosing said junction and at least the portion of said elements which extend outwardly from said supporting structure, means for mounting said sheath member in said supporting structure to prevent ingress of molten material into said structure, electrical conductors extending into said supporting structure with ends thereof joined with the free terminal ends of said elements in said heat-insulated region and with the other ends of said conductors being adapted for connection to electrical conductors of the manipulator, and tubular structure of heat-insulating material having an end adapted to receive said supporting structure and slideable relative to the manipulator, said tubular structure having a length sufficient to extend around said heat-insulated region and at least a portion of the length of said electrical conductors.

32. A high-temperature heat-sensing unit for immersion pyrometry comprising body structure having an immersible end, a thermocouple having thermocouple elements of short length and small cross section extending outwardly a short distance from said immersible end of said body structure with the outwardly extending ends of the elements joined to form a measuring junction and with the other ends of said elements extending a short distance into said body structure, electrical conductors of material different from the material of said thermocouple elements connected within said body structure to said thermocouple elements and extending through the body structure to the other end thereof for connection to a measuring instrument, and tubular protective structure including an end-cap of low heat-conducting material in the order of that of heavy paper, said cap having an aperture in the end thereof for the passage of said measuring junction and slidable into protective relation with said body structure.

References Cited in the file of this patent

UNITED STATES PATENTS

| | | |
|---|---|---|
| Re. 22,883 | Heyer | Aug. 17, 1942 |
| 1,651,750 | Brophy | Dec. 6, 1927 |
| 2,071,531 | Hulme | Feb. 23, 1937 |
| 2,142,677 | Parker | Oct. 30, 1939 |
| 2,463,427 | Richards | Mar. 1, 1949 |
| 2,525,439 | Abbot | Oct. 10, 1950 |
| 2,581,229 | Battery | Jan. 1, 1952 |
| 2,584,616 | Richards | Feb. 5, 1952 |
| 2,732,416 | Robertson | Jan. 24, 1956 |
| 2,757,220 | Carter | July 31, 1956 |
| 2,785,216 | Winner | Mar. 12, 1957 |
| 2,858,351 | Taylor | Oct. 28, 1958 |

FOREIGN PATENTS

| | | |
|---|---|---|
| 706,643 | Great Britain | Mar. 31, 1954 |
| 72,858 | Germany | Feb. 19, 1893 |

OTHER REFERENCES

Trans. Amer. Soc. of Mech. Engrs., vol. 27, 1906, page 587.

Disclaimer 2,999,121.—*Harold G. Mead*, Rosemont, Pa. FAST ACTING TOTALLY EXPENDABLE IMMERSION THERMOCOUPLE. Patent dated Sept. 5, 1961. Disclaimer filed Apr. 8, 1964, by the assignee, *Leeds and Northrup Company*.

Hereby enters this disclaimer to claims 10, 11, 12, 13, 14 and 15 of said patent.

[*Official Gazette June 23, 1964.*]

Disclaimer 2,999,121.—*Harold G. Mead*, Rosemont, Pa. FAST ACTING TOTALLY EXPENDABLE IMMERSION THERMOCOUPLE. Patent dated Sept. 5, 1961. Disclaimer filed Apr. 8, 1964, by the assignee, *Leeds and Northrup Company*.

Hereby enters this disclaimer to claims 10, 11, 12, 13, 14 and 15 of said patent.

[*Official Gazette June 23, 1964.*]